(12) United States Patent
Carpenter et al.

(10) Patent No.: US 11,796,381 B1
(45) Date of Patent: Oct. 24, 2023

(54) WEIGHT VERIFICATION AND TARE PROCESS FOR SCALE

(71) Applicant: Greater Goods, LLC, St. Louis, MO (US)

(72) Inventors: David Matthew Carpenter, St. Louis, MO (US); Daniel Joseph Mirth, St. Louis, MO (US); Jeremy Jason Dexter, Guangdong (CN); Christopher Eric Chupp, O'Fallon, MO (US)

(73) Assignee: Greater Goods, LLC

( * ) Notice: Subject to any disclaimer, the term of this patent is extended or adjusted under 35 U.S.C. 154(b) by 225 days.

(21) Appl. No.: 17/092,252

(22) Filed: Nov. 7, 2020

(51) Int. Cl.
  *G01G 23/16* (2006.01)
  *G01G 19/44* (2006.01)
  *G01G 23/36* (2006.01)

(52) U.S. Cl.
  CPC ........... *G01G 23/166* (2013.01); *G01G 19/44* (2013.01); *G01G 23/361* (2013.01)

(58) Field of Classification Search
  CPC ..... G01G 19/44; G01G 23/166; G01G 23/361
  See application file for complete search history.

(56) References Cited

U.S. PATENT DOCUMENTS

| | | | |
|---|---|---|---|
| 3,134,451 A | 5/1964 | Hanssen | |
| 4,165,633 A * | 8/1979 | Raisanen | G01N 5/045 702/50 |
| 4,694,920 A * | 9/1987 | Naito | G01G 23/01 177/25.18 |
| 5,610,373 A | 3/1997 | Graves | |
| 6,725,165 B1 * | 4/2004 | Knox | B60R 21/0152 177/144 |
| 7,138,585 B2 | 11/2006 | Kohn | |
| 2008/0314648 A1 * | 12/2008 | Suzuki | A61B 5/4872 177/25.13 |
| 2009/0076756 A1 * | 3/2009 | Inoue | G01G 23/16 73/1.13 |
| 2009/0151420 A1 * | 6/2009 | McMasters | G01G 23/01 73/1.13 |
| 2009/0166095 A1 * | 7/2009 | Suzuki | G01G 23/36 177/210 R |
| 2011/0172943 A1 * | 7/2011 | Roberts | G01G 23/166 702/87 |
| 2014/0090444 A1 * | 4/2014 | Onomatsu | G01G 19/44 73/1.13 |

(Continued)

*Primary Examiner* — Natalie Huls
(74) *Attorney, Agent, or Firm* — CREATIVENTURE LAW, LLC; Dennis J M Donahue, III; Kevin Staed

(57) ABSTRACT

An electronic scale performs a post-weighing calibration in which the user steps on the scale, and the scale provides an estimated weight based on the scale's stored tare weight determined after the previous weighing performed by the scale. The person steps off of the scale while the estimated weight is displayed, and the scale automatically performs the calibration process to determine the scale's tare weight and verifies the weight. The estimated weight is shown with an orange ellipsis, and the verified weight is shown with a green checkmark. The scale compares the stored tare weight with the new tare weight, and if the difference between the stored tare weight and the new tare weight is within a variation threshold, the scale identifies the weight as being verified. If the difference exceeds the variation threshold, the scale recalculates the weight, displays the corrected weight, and produces a tone as an alert.

35 Claims, 3 Drawing Sheets

(56) References Cited

U.S. PATENT DOCUMENTS

| | | | |
|---|---|---|---|
| 2014/0345954 A1* | 11/2014 | Fukada | G01G 19/50 177/1 |
| 2016/0018254 A1* | 1/2016 | Wechselberger | G01G 23/3735 177/1 |
| 2016/0076930 A1* | 3/2016 | Sakai | A61B 5/4023 177/1 |
| 2017/0199073 A1* | 7/2017 | Carreel | G01G 21/244 |
| 2020/0345568 A1* | 11/2020 | Heimbrock | G01G 19/445 |

\* cited by examiner

WEIGHT VERIFICATION AND TARE PROCESS FOR SCALE

CROSS-REFERENCE TO RELATED APPLICATIONS

This application is an original filing of the invention as a non-provisional patent application and does not claim a right of priority to any other application or the benefit of an earlier filing date.

STATEMENT REGARDING FEDERALLY SPONSORED RESEARCH

Not Applicable.

APPENDIX

Not Applicable.

BACKGROUND OF THE INVENTION

Field of the Invention

The present invention relates to electronic scales, and more particularly to electronic scales which perform an automatic tare calibration.

Related Art

Electronic scales that can perform automatic tare calibrations have been known for decades, but these automatic calibrations require the user to follow correct procedures in order for the scale to take an accurate tare reading. Consequently, user error has continued to be a significant source of problems with automatic tare calibrations, and as indicated in US Pat. No. 7,138,585 which is hereby incorporated by reference, users often erroneously conclude that their scale is defective and return the scale although it is properly functioning and correctly operating. There have been a number of solutions that have sought to reduce human error in the automatic calibration process, and the '585 Patent suggests yet another solution. However, the '585 Patent follows the same automatic calibration methods that have been previously known and merely displays the instructions on the display screen of the scale in an effort to get the user to comply with the instructions. What is needed is an automatic calibration process that is intuitive to the user and fits within the way that users want to operate their scales and which also minimizes the potential for the introduction of any human error into the calibration process.

In determining an improved automated calibration process that reduces human error, it is important to understand how users want to use their scales so that the machine's calibration process fits with the desires of the human user rather than giving instructions to the users that they do not want to follow. If the calibration process fits the desired usage of the scales by the users, their actions in using the scales will be more likely in compliance with the calibration technique designed for their desired actions. Generally, people want to just step on a scale and be weighed accurately and then put away the scale; they do not want to wait until the scale calibrates itself before they step on the scale and they do not want to have to wait until the scale goes to sleep to put away the scale after they are given their weight to ensure that the scale's calibration is accurate for the next weighing. However, the calibration is important because an accurate calculation of a person's weight is the total weight measured by the scale's load cells minus the weight of the scale itself ($Wt_{user} = Wt_{total} - Wt_{scale}$) the total weight includes the weight of the user and the scale. Therefore, the scale has to have a celebration point for the weight of the scale so that it can be deducted from the total weight to show the user their weight.

The current methods for the calibration process are not optimized for the way that people want to use their scales. For current scales that perform a pre-weighing calibration process, the user must first tap awake the scale and then wait while the scale performs its calibration process (weighing itself) before the user can step onto the scale and get weighed. Accordingly, the pre-weighting calibration process places additional requirements on the user each time they want to get weighed and is slower than users want for their weighing experience. For current scales that perform a post-weighing calibration process, the scale performs the calibration process after the person steps off the scale, before the scale enters a sleep mode or is turned off, and the scale stores the calibration point in a memory unit so that the scale can use the calibration the next time that the scale is activated. The post-weighing calibration process is very good but sometimes people store their scales on the side, such against a wall or a cabinet, to get the scale out of the way, and when the scale is placed on its side before the calibration is performed, the calibration point is inaccurate. The scale will not provide any indication to the user that there has been an error in the calibration process, and the user will get an erroneous weight reading the next time that they step on the scale.

Accordingly, in addition to providing a scale with an intuitive calibration process that fits within the way that users want to operate their scales and which minimizes the potential for the introduction of any human error into the calibration process, it would be beneficial if the scale would provide a confirmation to the user that the calibration has been successful and their weight is verified. It would also be beneficial if the scale provides an indication to the user if there has been an error at some point in the calibration process.

SUMMARY OF THE INVENTION

In one aspect of the invention, a post-weighing calibration is performed so that the user can step on the scale, the scale automatically determines an estimated weight based on the stored tare weight from the previous weighing performed by the scale. The person steps off of the scale while the estimated weight is displayed, and the scale automatically performs the calibration process to determine the scale's tare weight. The scale compares the stored tare weight with the new tare weight and provides feedback to the user for the verification of the weight. If the difference between the stored tare weight and the new tare weight is within a variation threshold, the scale identifies the weight as being verified. If the difference exceeds the variation threshold, the scale recalculates the weight and displays the corrected weight.

In another aspect of the invention, the estimated weight is shown with one graphical indicia in one color (preferably an orange ellipsis) while the verified weight is shown with another graphical indicia with another color (preferably a green checkmark).

In yet another aspect of the invention, when the difference between the stored tare weight with the new tare weight exceeds the variation threshold, in addition to changing the weight on the display and changing the graphical indicia to indicate that the weight is now verified, the scale makes an audible tone alerting the user that the estimated weight has been changed to the verified weight.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings as summarized below.

DETAILED DESCRIPTION OF THE PREFERRED EMBODIMENTS

The following description of the preferred embodiment(s) is merely exemplary in nature and is in no way intended to limit the invention, its application, or uses.

Figure 1:
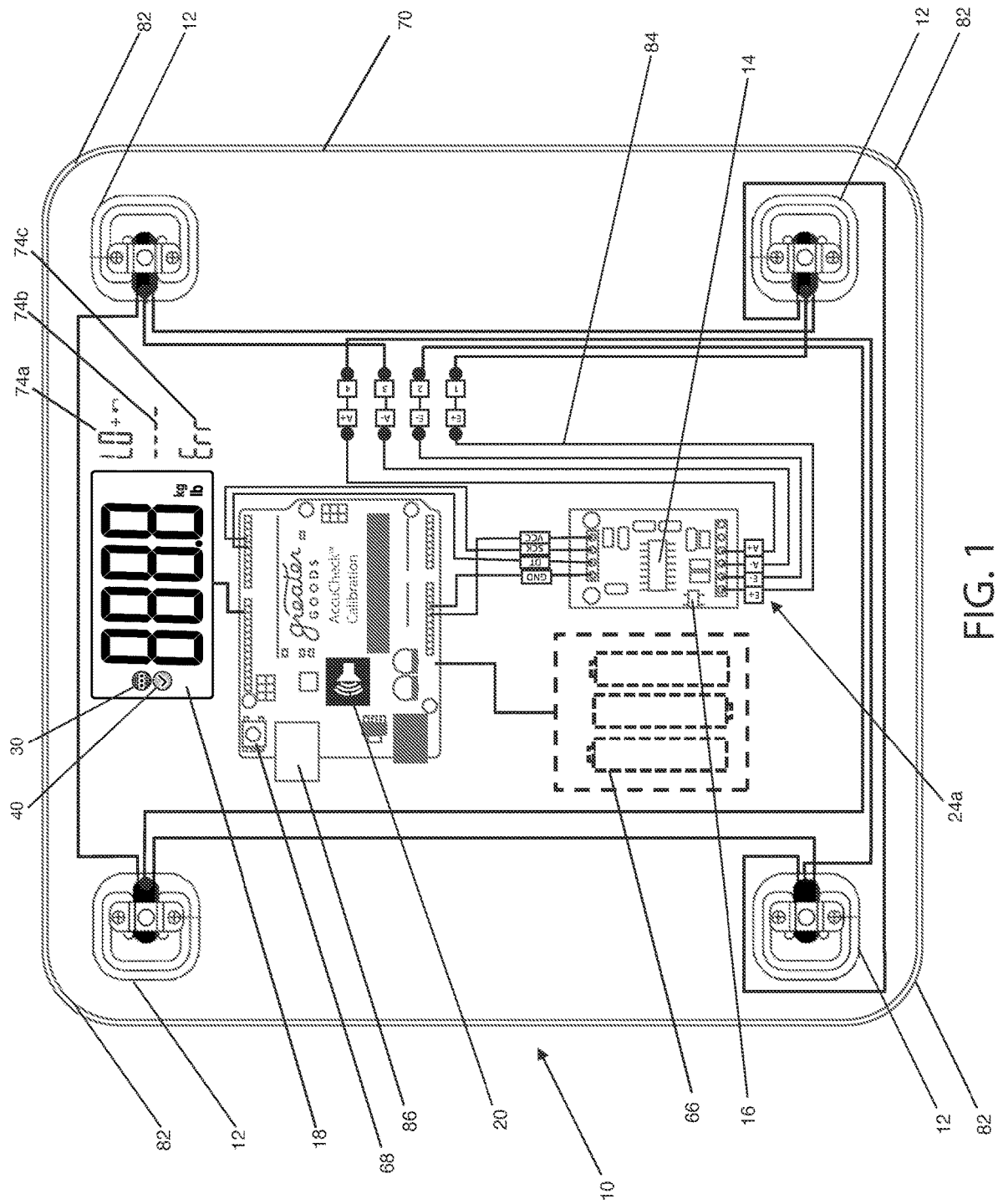
FIG. 1 is a schematic view of an electronic scale according to the present invention.

As shown in FIG. 1, the electronic scale 10 has a base housing 70 that contains four (4) weight sensors 12, a computer processor 14, a memory unit 16, a display screen 18, a speaker 20, a power source 66, and a power switch 68. A platform 80 is positioned over the housing, and the weight sensors are connected to the platform proximate to corresponding corners 82 of the scale 10. The computer processor operatively communicates with the weight sensors, the memory unit, the display screen, and the speaker, preferably through internal wired connections 84. The scale may also have an external communication module 86, such as with a wired cable or wireless transfer. Batteries within a compartment in the base housing preferably serve as the power source for the electronics (i.e., computer processor, memory unit, display screen, speaker, and any external communication), although it will be appreciated that any type of power source can be used, including a wired source such as with a barrel jack or a USB connection, or a wireless source, such as an induction circuit.

When the power switch is in its on-position, the scale 10 has a sleep mode of operation 205 for saving energy and an active wake mode of operation 210 for displaying the weight being measured and the corresponding graphical indicia. The computer processor automatically puts the scale into the sleep mode after a set period of time after a person steps off of the scale. The power switch can also be switched off to conserve energy when the scale will not be used for an extended period of time. It will also be recognized that with the sleep mode, the scale may not require a power switch and could remain in the sleep mode whenever there is power and the active mode has not been triggered. For example, the scale may have power whenever charged batteries contact the power circuit leads in the battery compartment.

Figure 2:
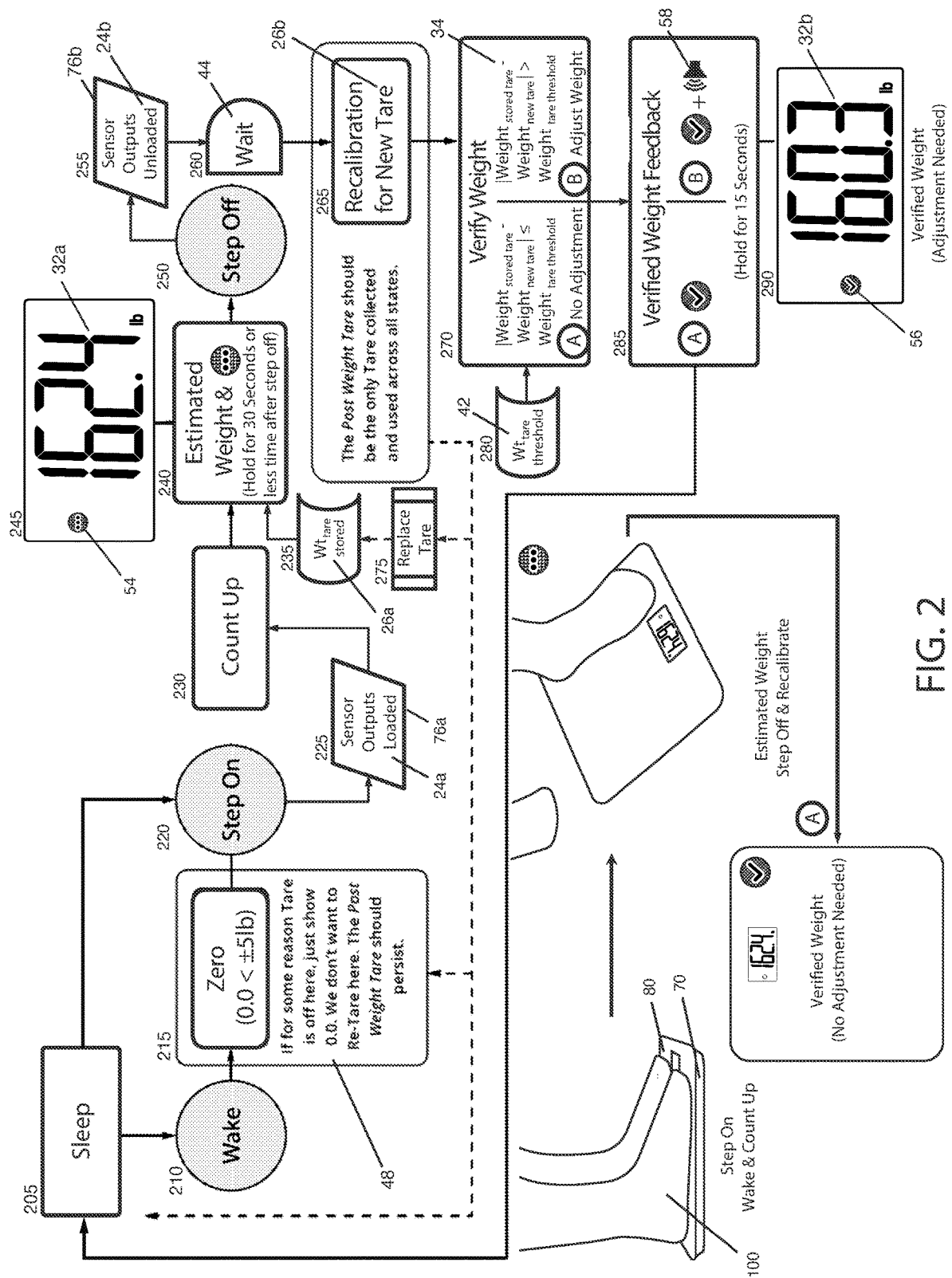
FIG. 2 is a flowchart of the weighing process for the electronic scale shown in FIG. 1 according to the present invention.

The operation of the scale is similar to existing electronic scales that perform a post-weighing calibration and is shown in FIG. 2. Generally, when the user touches the platform, such as when initially touching the scale when stepping onto the scale, the scale automatically changes from the sleep mode 205 to the active wake mode 210, and the user 100 fully steps onto the scale 220 to determine the weight 110. When activated, the computer processor reads 235 from the memory unit 16 the stored tare weight 26a that had been determined during the previous weighing cycle performed by the scale. In the present invention, the weight that is calculated 240 by the computer processor based on the scale's stored tare weight is identified as the estimated weight 32a when displayed, and when the person steps off 250 of the scale while the estimated weight is displayed, the scale automatically performs the calibration process 265 to determine the scale's new tare weight 26b and then verifies the weight 270. The estimated weight is shown 245 with an orange ellipsis 30 serving as an estimated weight icon 54, and the verified weight follows alternative feedback paths 285 and is shown 290 with a green checkmark 40 serving as a verified weight icon 56. As described in more detail below, the scale compares the stored tare weight with the new tare weight 34, and if the difference between the tare weights is within a tare variation threshold 42, the scale identifies the weight as being verified 32b. If the difference exceeds the tare variation threshold, the scale recalculates the weight, displays the corrected weight, and produces an audible tone 58 as an alert.

In operation, the weight sensors produce 225 loaded sensor outputs 24a at a first time 76a when the weight is on the electronic scale. The weight sensors also produce 255 unloaded sensor outputs 24b at a second time 76b after the first time when the weight is removed from the electronic scale. The computer processor receives the loaded sensor outputs from the weight sensors and calculates the estimated weight 32a according to an algorithmic function of the loaded sensor outputs ($S_l$), i.e., $Wt_{loaded}=f(S_l)$, minus the stored tare weight and instructs 260 the display screen to show the estimated weight for a first period of time 44 after the second time. The computer processor calculates a new tare weight 26b according the algorithmic function with the unloaded sensor outputs ($S_u$), i.e., $Wt_{tare}=f(S_u)$, and calculates a verified weight 32b according to the algorithmic function of the loaded sensor output minus the new tare weight during the first period of time. The computer processor instructs the display screen to show the verified weight for a second period of time after the first period of time. The equations for the estimated weight and the verified weight are listed below.

$$\text{Estimated Weight } (Wt_{estimated})=Wt_{loaded}-Wt_{stored\ tare}$$

$$\text{Verified Weight } (Wt_{verified})=Wt_{loaded}-Wt_{new\ tare}$$

It will be appreciated that if the only difference between the estimated weight and the verified weight is a change in the weight that is shown in the display screen and/or a the change in the graphical indicia from the estimated weight icon 54 to the verified weight icon 56, the user may not notice when a change has been made to the weight. It will also be appreciated that there could be slight changes in the tare weights between consecutive weighing cycles, and these slight weight changes may even be within the resolution of the weight sensors in measuring the tare weight, such as sensors that can measure within 0.2 lb and the scale 10 by itself only weights two or three pounds (2-3 lbs.) so that a display that shows weights to the tenth of a pound (0.10 lb) would regularly be changing the verified weight from the estimated weight which may be unnecessary and unrealistically sensitive based on the resolution of the sensors. Accordingly, in the preferred embodiment, the tare variation threshold 42 is also stored 280 in the memory unit, and the computer processor compares a difference 34 between the stored tare weight and the new tare weight to the tare variation threshold and provides alternative feedback information to the user depending on whether the difference is within the threshold or exceeds the threshold.

Feedback A (Difference Within Threshold): $|Wt_{stored\ tare} - Wt_{new\ tare}| \leq Wt_{tare\ threshold}$ Feedback B (Difference Exceeds Threshold): $|Wt_{stored\ tare} - Wt_{new\ tare}| > Wt_{tare\ threshold}$ When the new tare weight differs from the stored tare weight by an amount that is within the tare variation threshold, no adjustment to the estimated weight is needed so the computer processor would not even need to calculate the verified weight. Rather than calculate a different verified weight, the computer processor would keep the estimated weight on the display screen and would only change the graphical indicia from the estimated weight icon 54 to the verified weight icon 56 to indicate that the weight has been verified. In comparison, when the difference between the stored tare weight with the new tare weight exceeds the variation threshold, the computer processor calculates the verified weight and instructs the display screen to show the verified weight with the corresponding green checkmark. Additionally, when there needs to be an adjustment from the estimated weight to the verified weight, the computer processor instructs the speaker to make an audible tone which alerts the user to the change and draws the user's attention back to the display screen to view the verified weight. The computer processor also replaces 275 the stored tare weight in the memory unit with the new tare weight. Regardless of the feedback path where no adjustment is needed (Feedback A) or an adjustment is needed (Feeback B), the display screen, the weight sensor, and the computer processor reenter the sleep mode 205 after the second period of time following the step of showing the verified weight and green checkmark on the display.

The tare variation threshold is preferably set at a value that is close to the resolution capability of the weight sensors and is consistent with the accuracy of the scale 10 and the significant digits being shown on the display screen. For example, for sensors that have a resolution within 0.2 lb and a display screen that shows weights to the tenth of a pound, it would be preferable to have a tare variation threshold that is one tenth of a pound ($Wt_{tare\ threshold} \approx 0.10$ lb). In most scales for weighing a person, the tare variation threshold 42 will be less than one pound and greater than zero pounds (0 lb $< Wt_{tare\ threshold} <$ 1 lb).

In the preferred embodiment that is described above and shown in the drawings, multiple weight sensors are used in the scale. Accordingly, the estimated weight and the verified weight are determined according to an aggregate of the algorithmic function of the set of loaded sensor outputs minus the stored tare weight and the new tare weight, respectively, and the tare weight calculation is performed as a post-loaded calculation with another aggregate of the algorithmic function according to the set of unloaded sensor outputs. When a person steps onto the scale, the electronic components wake from their sleep mode to their active mode; and as the weight sensors dynamically transition from their unloaded state to a steady-state loaded state with the person's full weight on the scale, the computer processor runs the algorithmic function multiple times 62 with the sensor outputs which results in a count up 230 to the estimated weight. The display screen preferably shows the count up of the multiple weight calculations, and when steady state is determined, such as when a change in weight over time is within a threshold level 22, the computer processor locks in the estimated weight and instructs the display screen to show the orange ellipsis to indicate the estimated weight has been determined and to signal the user to step off the scale so that the weight can be verified. Once the person steps off of the scale, the computer processor verifies the weight as described above and instructs the display screen to show the green checkmark with the verified weight.

Although multiple weight sensors are preferably used, it will also be appreciated that a single weight sensor could be used in the electronic scale. The weight sensors can be any type of electronic load cell, such as resistive load cells or capacitive load cells. Generally, resistive load cells function according to piezo-resistivity principles so that when a weight is applied to the sensor, its resistance changes so that its output voltage will change for a given input voltage. In comparison, capacitive load cells function according to changes in their ability to hold a certain amount of charge for a given input voltage, when a weight is applied to the sensor with parallel plates, the gap between the plates changes which results in a change in the capacitance. Depending on the type of load cell, there is an algorithmic function that converts the output from the load cell into a force, i.e., a weight for load cells used in a scale. Some load cells may also include a thermocouple to measure the ambient temperature and factor it into the equation for determining the force. Although temperature can impact the measurements of load cells, it will be appreciated that for most scale applications, the scales are typically used in temperature controlled environments that are maintained within a small temperature range (e.g., 60° F.-85° F.) and is well within the operating range of the scales (e.g., 32° F.-104° F.).

When a person activates the scale but does not step onto the scale, the computer processor instructs 215 the display screen to show zero pounds (0 lb) 48 regardless of what has been saved as the stored tare weight from the last weighing cycle, even if the tare is off zero for some reason. The computer processor does not perform any preloaded tare weight calculation when the weight sensors and the computer processor are activated even if the weight sensors remain unloaded in their preloading condition. The new tare weight that had been saved in the memory during the post-weighing calibration during the previous weighing cycle as described above (i.e., the post weight tare) persists in the memory as the stored tare weight and is used in determining the estimated weight when the scale is next activated. The post weight tare is the only tare that is collected and saved in the memory as the stored tare weight and is used across all states.

In the preferred embodiment, the display screen is affixed into the electronic scale and is visible through the platform 80 which may be transparent or could have a window or aperture over the display screen. It will also be appreciated that the display screen could be separate from the housing of the scale, such as with physician weight scales in which the display may be connected to the scale by a flexible wire or spaced from the scale's platform by an elongated stand. Alternatively, the scale may not even have its own screen and could connect with a smart-phone and use the smart-phone's screen for its display screen.

It will be appreciated that rather than performing a post-weighing calibration that saves the post-loaded tare weight which is then used for calculating the initial estimate of the weight, an alternative weight validation system could calculate the estimated weight using a preset estimated tare weight and then correct the weight when the person steps off of the scale. This alternative technique would not replace the tare weight after each weighing cycle, but it would mostly likely result in a change from the estimated weight to a different verified weight much more frequently than in the preferred embodiment in which the stored tare weight is the post-loaded tare weight from the previous weighing cycle. It will also be appreciated that comparing the new tare weight to the stored tare weight is equivalent to comparing the verified weight to the estimated weight, and the benefit of comparing the tare weights is that the verified weight does not even need to be calculated when the difference between the tare weights is within the tare variation threshold.

Figure 3:
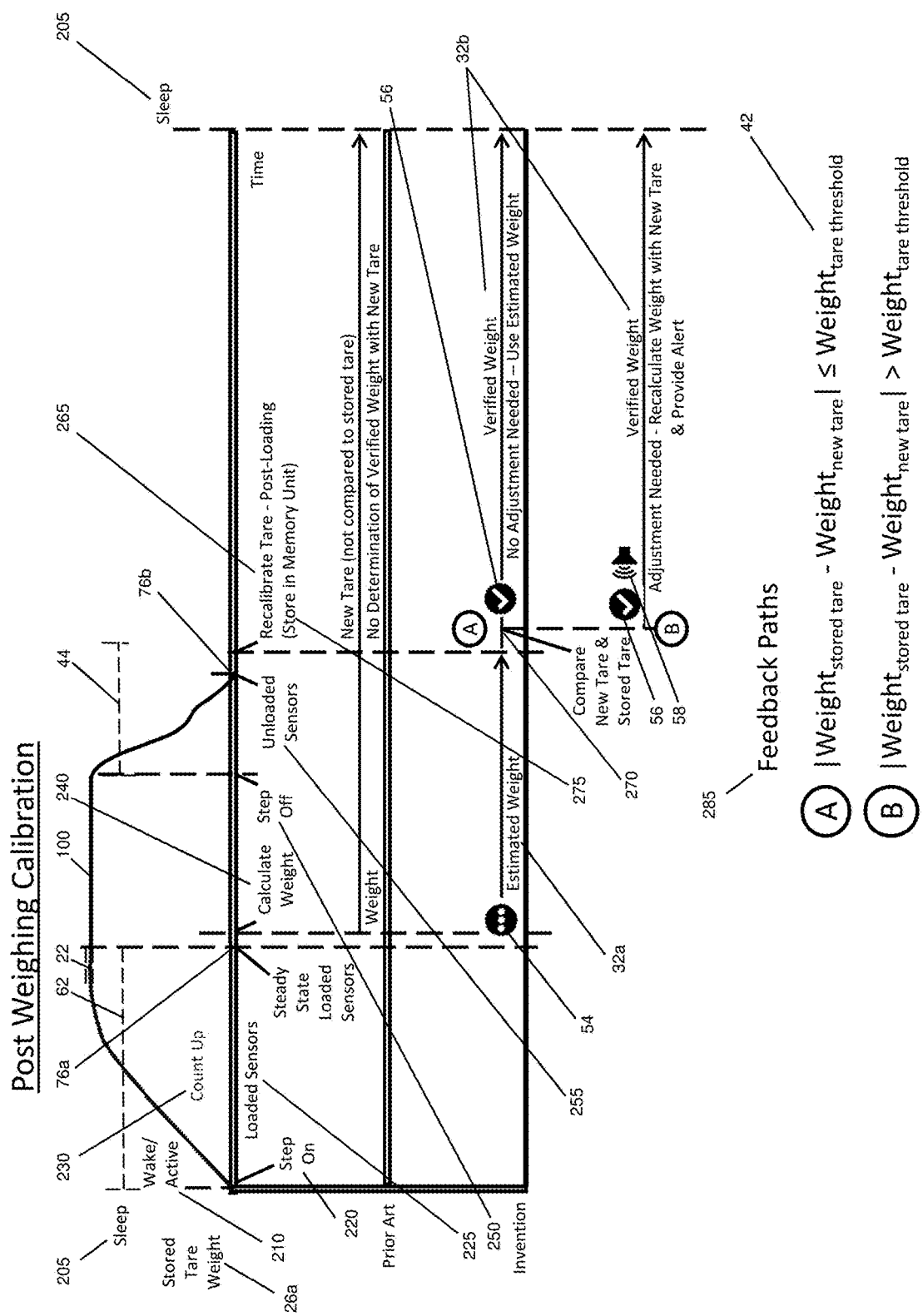
FIG. 3 is a post-weighing calibration timeline showing the relative timing of actions performed by prior art scales and performed by the present invention.

The benefits of the present invention as compared with prior art post-weighing calibration techniques are graphically shown in FIG. 3 for a weighing cycle. In prior art systems, there is only one calculation of the weight. There is no additional calculation of the weight after the new tare is determined. In comparison, as explained in detail above according to the system and method of the present invention, when the difference between the stored tare weight and the new tare weight exceed the tare variation threshold, the weight is adjusted accordingly from the estimated weight to the verified weight and a sound is emitted by the scale to notify the user that the verified weight has been corrected. Whenever the verified weight is displayed, regardless whether there is a change from the estimated weight to the verified weight or there is no change, the present invention changes the display from the estimated weight icon with the estimated weight to the verified weight icon with the verified weight.

In addition to showing the estimated weight and the verified weight on the display screen with the corresponding graphical indicia, the scale can also display other information and messages to the user. Preferably, the display includes a battery icon that identifies the charge level of the batteries, and "LO" 74a is shown on the display screen when the voltage level of the batteries is below a threshold power level. The display screen shows "- - - -" 74b when the amount of weight on the scale exceeds the capacity of the weight sensors. The display screen shows "ERR" 74c when there is either a hardware or software failure which requires either a soft reset with a reset button that interrupts the power to the circuit or the power may need to be turned off completely for a longer period of time, such as several seconds.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, although the description above refers to a person using a scale for weighing oneself, the calibration technique of the present invention can be used with any scale that measures the weight of any object, animate or inanimate. Thus, the breadth and scope of the present invention should not be limited by any of the above-described exemplary embodiments, but should be defined only in accordance with the following claims appended hereto and their equivalents.

What is claimed is:

1. A method for verifying a weight determined by an electronic scale, comprising:
provinding a plurality of weight sensors in the electronic scale;
providing a computer processor in the electronic scale, wherein the computer processor is in operative communication with the weight sensors;
providing a memory unit in the electronic scale, wherein the memory unit is in operative communication with the computer processor;
providing a display screen on the electronic scale, wherein the display screen is in operative communication with the computer processor;
automatically activating the weight sensors and the computer processor when a person steps on the electronic scale;
receiving in the computer processor a first set of sensor outputs from the weight sensors and a stored tare weight from the memory unit;
performing a weight calculation in the computer processor according to an algorithmic function of the first set of sensor outputs minus the stored tare weight to determine an estimated weight of the person;
showing the estimated weight on the display screen with a first graphical indicia corresponding to and separate from the estimated weight;
receiving in the computer processor a second set of sensor outputs from the weight sensors after the person steps off the electronic scale;
performing a tare weight calculation in the computer processor using the second set of sensor outputs to automatically calculate a new tare weight;
comparing in the computer processor a difference between the stored tare weight and the new tare weight to a tare variation threshold;
performing the weight calculation in the computer processor according to the algorithmic function of the first set of sensor outputs minus the new tare weight to determine a verified weight of the person;
replacing the stored tare weight in the memory unit with the new tare weight used to determine the verified weight of the person, wherein the computer processor does not perform any preloaded tare weight calculation after replacing the stored tare weight in the memory unit with the new tare weight; and
showing the verified weight on the display screen with a second graphical indicia corresponding to and separate from the verified weight.

2. The method of claim 1, wherein the step of replacing the stored tare weight in the memory unit with the new tare weight is performed at the same time as or before the showing of the second graphical indicia with the verified weight, wherein the first graphical indicia has a first color and a first icon corresponding with the estimated weight, and wherein the second graphical indicia has a second color and a second icon corresponding with the verified weight.

3. The method of claim 1, further comprising the steps of:
waiting a first period of time after the person steps off the electronic scale and the weight sensors are unloaded for the computer processor to take the second set of sensor outputs;
automatically putting the display screen, the weight sensors, and the computer processor into a sleep mode after a second period of time following the step of showing the verified weight, wherein the second period of time is greater than the first period of time, and wherein the step of replacing the stored tare weight in the memory unit is performed before putting the computer processor into the sleep mode; and repeating the step of automatically activating the weight sensors and the computer processor after the step of automatically putting display screen, the weight sensors and the computer processor into the sleep mode when the person steps on the electronic scale, wherein the stored tare weight persists in the memory unit throughout the sleep mode.

4. The method of claim 1, further comprising the steps of: providing a speaker in the electronic scale, wherein the speaker is controlled by the computer processor; and producing an audible tone with the speaker when the new tare weight differs from the stored tare weight by more than the tare variation threshold resulting in the verified weight differing from the estimated weight by more than the tare variation threshold.

5. The method of claim 4, wherein the tare weight calculation uses the same algorithmic function of the weight calculation with the second set of sensor outputs, wherein the new tare weight has a difference from the stored tare weight that is less than the tare variation threshold and the computer processor causes the speaker to not produce any sound when the verified weight is shown on the display, and wherein the new tare weight has a difference from the stored tare weight that is greater than the tare variation threshold and the computer processor causes the speaker to produce the audible tone when the verified weight is shown on the display.

6. The method of claim 1, further comprising the step of showing zero pounds on the display when the weight sensors and the computer processor are first activated without any preloaded tare weight calculation, wherein the step of replacing the stored tare weight with the new tare weight is performed before the computer processor is in a sleep mode, and wherein the stored tare weight persists in the memory unit throughout the sleep mode.

7. The method of claim 6, wherein the weight calculation is an aggregate of the algorithmic function according to the first set of sensor outputs and is performed multiple times while the weight sensors dynamically transition from an unloaded state to a steady-state loaded state, and wherein the tare weight calculation is only performed as a post-loaded calculation with another aggregate of the algorithmic function according to the second set of sensor outputs.

8. A method for verifying a weight determined by an electronic scale, comprising:
providing a weight sensor in the electronic scale;
providing a computer processor in the electronic scale, wherein the computer processor is in operative communication with the weight sensor;
providing a memory unit in the electronic scale, wherein the memory unit is in operative communication with the computer processor;
providing a display screen, wherein the display screen is in operative communication with the computer processor;
receiving in the computer processor a loaded sensor output from the weight sensor and a stored tare weight from the memory unit when a weight is on the electronic scale at a first time;
performing a weight calculation in the computer processor according to an algorithmic function of the loaded sensor output minus the stored tare weight to determine an estimated weight;

receiving in the computer processor an unloaded sensor output from the weight sensor at a second time after the first time when the weight is removed from the electronic scale;

showing the estimated weight on the display screen before the second time and for a first period of time after the second time;

applying the algorithmic function for the weight calculation in the computer processor using the unloaded sensor output to calculate a new tare weight;

performing the weight calculation in the computer processor according to the algorithmic function of the loaded sensor output minus the new tare weight to determine a verified weight;

replacing the stored tare weight in the memory unit with the new tare weight used to determine the verified weight, wherein the computer processor does not perform any preloaded tare weight calculation after replacing the stored tare weight in the memory unit with the new tare weight; and showing the verified weight on the display screen for a second period of time after the first period of time.

9. The method of claim 8, further comprising the steps of automatically activating the weight sensor and the computer processor at the first time when the weight is added to the electronic scale; and automatically putting the display screen, the weight sensor, and the computer processor into a sleep mode after the second period of time following the step of showing the verified weight on the display, wherein the step of replacing the stored tare weight with the new tare weight is performed before the computer processor is in the sleep mode, wherein the stored tare weight persists in the memory unit during throughout the sleep mode.

10. The method of claim 8, further comprising the steps of:
comparing in the computer processor a difference between the stored tare weight and the new tare weight to a tare variation threshold;
showing the estimated weight on the display screen with a first graphical indicia corresponding to and separate from the estimated weight; and
showing the verified weight on the display screen with a second graphical indicia corresponding to and separate from the verified weight.

11. The method of claim 10, further comprising the steps of:
providing a speaker in the electronic scale, wherein the speaker is controlled by the computer processor; and
producing an audible tone with the speaker when the new tare weight differs from the stored tare weight by more than the tare variation threshold resulting in the verified weight differing from the estimated weight by more than the tare variation threshold, and wherein the step of replacing the stored tare weight in the memory unit with the new tare weight is performed at the same time as or before the showing of the second graphical indicia with the verified weight.

12. The method of claim 8, further comprising the steps of:
providing a plurality of weight sensors in the electronic scale;
receiving in the computer processor a set of loaded sensor outputs from the weight sensors at the first time and a set of unloaded sensor outputs from the weight sensors at the second time, wherein the estimated weight and the verified weight are determined according to the algorithmic function of the set of loaded sensor outputs minus the stored tare weight and the new tare weight, respectively, and wherein the new tare weight is determined according to the algorithmic function of the set of unloaded sensor outputs.

13. The method of claim 8, further comprising the step of presetting the tare variation threshold at a value less than one pound and greater than zero pounds.

14. A method for verifying a weight determined by an electronic scale, comprising:
providing a weight sensor in the electronic scale;
providing a computer processor in the electronic scale, wherein the computer processor is in operative communication with the weight sensor;
providing a memory unit in the electronic scale, wherein the memory unit is in operative communication with the computer processor;
providing a display screen, wherein the display screen is in operative communication with the computer processor;
receiving in the computer processor a loaded sensor output from the weight sensor and a stored tare weight from the memory unit when a weight is on the electronic scale at a first time;
performing a weight calculation in the computer processor according to an algorithmic function of the loaded sensor output minus the stored tare weight to determine an estimated weight;
receiving in the computer processor an unloaded sensor output from the weight sensor at a second time after the first time when the weight is removed from the electronic scale;
showing the estimated weight on the display screen before the second time and for a first period of time after the second time;
applying the algorithmic function for the weight calculation in the computer processor using the unloaded sensor output to calculate a new tare weight;
comparing in the computer processor a difference between the stored tare weight and the new tare weight to a tare variation threshold;
replacing the stored tare weight in the memory unit with the new tare weight after using the new tare weight in the comparing step, wherein the computer processor does not perform any preloaded tare weight calculation after replacing the stored tare weight in the memory unit with the new tare weight;
performing a first feedback operation when the difference between the stored tare weight and the new tare weight is within the tare variation threshold; and
performing a second feedback operation when the difference between the stored tare weight and the new tare weight is within the tare variation threshold.

15. The method of claim 14, wherein at least one of the first feedback operation and the second feedback operation comprise the steps of:
performing the weight calculation in the computer processor according to the algorithmic function of the loaded sensor output minus the new tare weight to determine a verified weight; and
showing the verified weight on the display screen for a second period of time after the first period of time.

16. The method of claim 15, further comprising the step of automatically putting the display screen, the weight sensor, and the computer processor into a sleep mode after the second period of time following the step of showing the verified weight on the display, wherein the step of replacing the stored tare weight in the memory unit is performed before putting the computer processor into the sleep mode, and wherein the stored tare weight persists in the memory unit during throughout the sleep mode.

17. The method of claim 15, further comprising the steps of:
showing the estimated weight on the display screen with a first graphical indicia corresponding to and separate from the estimated weight; and
showing the verified weight on the display screen with a second graphical indicia corresponding to and separate from the verified weight.

18. The method of claim 17, further comprising the steps of:
providing a speaker in the electronic scale, wherein the speaker is controlled by the computer processor; and
producing an audible tone with the speaker when the second feedback operation is performed, and wherein the step of replacing the stored tare weight in the memory unit with the new tare weight is performed at the same time as or before the showing of the second graphical indicia with the verified weight.

19. A weight validation system for an electronic scale, comprising:
a display screen;
a weight sensor in the electronic scale, wherein the weight sensor produces a loaded sensor output at a first time when a weight is on the electronic scale, and wherein the weight sensor produces an unloaded sensor output at a second time after the first time when the weight is removed from the electronic scale;
a memory unit, wherein a stored tare weight is stored in the memory unit, and
a computer processor in operative communication with the display screen, the weight sensor, and the memory unit, wherein the computer processor receives the loaded sensor output from the weight sensor and calculates an estimated weight according to an algorithmic function of the loaded sensor output minus the stored tare weight, wherein the computer processor instructs the display screen to show the estimated weight for a first period of time after the second time, wherein the computer processor calculates a new tare weight according the algorithmic function with the unloaded sensor output, wherein the computer processor calculates a verified weight according to the algorithmic function of the loaded sensor output minus the new tare weight during the first period of time, wherein the display screen shows the verified weight for a second period of time after the first period of time, wherein the display screen, the weight sensor, and the computer processor enter a sleep mode after the second period of time, wherein the computer processor replaces the stored tare weight in the memory unit with the new tare weight before the computer processor enters the sleep mode, and wherein the stored tare weight persists in the memory throughout the sleep mode.

20. The weight validation system of claim 19, wherein the display screen is affixed into the electronic scale.

21. The weight validation system of claim 19, further comprising a tare variation threshold stored in the memory unit, wherein the computer processor compares a difference between the stored tare weight and the new tare weight to the tare variation threshold, wherein the verified weight differs from the estimated weight when the difference between the stored tare weight and the new tare weight exceeds the tare variation threshold, and wherein the computer processor does not perform any preloaded tare weight calculation after replacing the stored tare weight in the memory unit with the new tare weight.

22. The weight validation system of claim 21, further comprising a speaker in the electronic scale, wherein the speaker is controlled by the computer processor and produces an audible tone when the new tare weight differs from the stored tare weight by more than the tare variation threshold.

23. The weight validation system of claim 21, wherein the tare variation threshold is set at a value less than one pound and greater than zero pounds.

24. The weight validation system of claim 19, further comprising a first graphical indicia and a second graphical indicia respectively corresponding to the estimated weight and the verified weight, wherein the first graphical indicia and the second graphical indicia are respectively shown on the display screen contemporaneous with and separate from the estimated weight and the verified weight, respectively, and wherein the computer processor replaces the stored tare weight in the memory unit with the new tare weight at the same time as or before the second graphical indicia is shown with the verified weight.

25. The weight validation system of claim 19, further comprising a plurality of weight sensors in the electronic scale, wherein the weight sensors produce a set of loaded sensor outputs that are communicated to the computer processor at the first time when the weight is on the electronic scale, wherein the weight sensors produce a set of unloaded sensor outputs that are communicated to the computer processor at the second time after the first time when the weight is removed from the electronic scale, wherein the estimated weight and the verified weight are determined according to an aggregate of the algorithmic function of the set of loaded sensor outputs minus the stored tare weight and the new tare weight, respectively, and wherein the new tare weight is determined according to the algorithmic function of the set of unloaded sensor outputs.

26. A method for verifying a weight determined by an electronic scale, comprising:
providing a weight sensor in the electronic scale;
providing a computer processor in the electronic scale, wherein the computer processor is in operative communication with the weight sensor;
providing a memory unit in the electronic scale, wherein the memory unit is in operative communication with the computer processor;
providing a display screen on the electronic scale, wherein the display screen is in operative communication with the computer processor;
automatically activating the weight sensor and the computer processor when a person steps on the electronic scale;
receiving in the computer processor a loaded sensor output from the weight sensor and a stored tare weight from the memory unit;
performing a weight calculation in the computer processor according to an algorithmic function of the loaded sensor output minus the stored tare weight to determine an estimated weight of the person;
showing the estimated weight on the display screen;
showing a first graphical indicia on the display screen while the estimated weight is shown on the display screen;
receiving in the computer processor an unloaded sensor output from the weight sensor after the person steps off the electronic scale;
performing a tare weight calculation in the computer processor using the unloaded sensor output to automatically calculate a new tare weight;
comparing in the computer processor a difference between the stored tare weight and the new tare weight to a tare variation threshold;
performing the weight calculation in the computer processor according to the algorithmic function of the first set of sensor outputs minus the new tare weight to determine a verified weight of the person;
showing the verified weight on the display screen;
changing the first graphical indicia on the display screen to a second graphical indicia corresponding to the verified weight for a period of time while the verified weight is shown on the display screen;
automatically putting the weight sensor, the computer processor, and the display screen in a sleep mode after the period of time in which the second graphical indicia and the verified weight are shown together on the display screen; and
replacing the stored tare weight in the memory unit with another tare weight, wherein the replacement of the stored tare weight is performed before the step of putting the computer processor in the sleep mode, and wherein the computer processor doe not perform any preloaded tare weight calculation after replacing the store tare weight in the memory unit with anther tare weight.

27. The method of claim 26, further comprising the step of repeating the step of automatically activating the weight sensors and the computer processor after the step of automatically putting the display screen, the weight sensor and the computer processor into the sleep mode when the person steps on the electronic scale, wherein the stored tare weight persists in the memory unit throughout the sleep mode.

28. The method of claim 26, wherein the step of replacing the stored tare weight in the memory unit is further comprised of replacing the stored tare weight with the new tare weight used to determine the verified weight of the person.

29. The method of claim 26, wherein the first graphical indicia has a first color and a first icon corresponding with the estimated weight, and wherein the second graphical indicia has a second color and a second icon corresponding with the verified weight.

30. The method of claim 29, wherein the second icon is a checkmark.

31. The method of claim 26, wherein the step of replacing the stored tare weight in the memory unit with the new tare weight is performed at the same time as or before changing the first graphical indicia on the display screen to the second graphical indicia corresponding to the verified weight.

32. A method for verifying a weight determined by an electronic scale, comprising:
providing a weight sensor in the electronic scale;
providing a computer processor in the electronic scale, wherein the computer processor is in operative communication with the weight sensor;
providing a memory unit in the electronic scale, wherein the memory unit is in operative communication with the computer processor;
providing a display screen on the electronic scale, wherein the display screen is in operative communication with the computer processor;
automatically activating the weight sensor and the computer processor when a person steps on the electronic scale;

receiving in the computer processor a loaded sensor output from the weight sensor and a stored tare weight from the memory unit;

performing a weight calculation in the computer processor according to an algorithmic function of the loaded sensor output minus the stored tare weight to determine an estimated weight of the person;

showing the estimated weight on the display screen;

showing a first graphical indicia on the display screen while the estimated weight is shown on the display screen;

receiving in the computer processor an unloaded sensor output from the weight sensor after the person steps off the electronic scale;

performing a tare weight calculation in the computer processor using the unloaded sensor output to automatically calculate a new tare weight;

comparing in the computer processor a difference between the stored tare weight and the new tare weight to a tare variation threshold;

performing the weight calculation in the computer processor according to the algorithmic function of the first set of sensor outputs minus the new tare weight to determine a verified weight of the person;

showing the verified weight on the display screen;

changing the first graphical indicia on the display screen to a second graphical indicia corresponding to the verified weight for a period of time while the verified weight is shown on the display screen;

automatically putting the weight sensor, the computer processor, and the display screen in a sleep mode after the period of time in which the second graphical indicia and the verified weight are shown together on the display screen;

replacing the stored tare weight in the memory unit with another tare weight, wherein the replacement of the stored tare weight is performed before the step of putting the computer processor in the sleep mode; and repeating the step of automatically activating the weight sensors and the computer processor after the step of automatically putting the display screen, the weight sensor and the computer processor into the sleep mode when the person steps on the electronic scale, wherein the stored tare weight persists in the memory unit throughout the sleep mode.

33. The method of claim 32, wherein the computer processor does not perform any preloaded tare weight calculation after replacing the stored tare weight in the memory unit with another tare weight.

34. The method of claim 32, wherein the step of replacing the stored tare weight in the memory unit with the new tare weight is performed at the same time as or before changing the first graphical indicia on the display screen to the second graphical indicia corresponding to the verified weight.

35. The method of claim 32, wherein the first graphical indicia has a first color and a first icon corresponding with the estimated weight, and wherein the second graphical indicia has a second color and a second icon corresponding with the verified weight.

* * * * *